United States Patent
Chin et al.

(10) Patent No.: US 10,630,651 B2
(45) Date of Patent: Apr. 21, 2020

(54) VEHICLE SYSTEM AND CONTROL METHOD THEREOF

(71) Applicants: Hyundai Motor Company, Seoul (KR); Kia Motors Corporation, Seoul (KR); Postech Academy-Industry Foundation, Pohangi, Gyeongsangbuk-do (KR)

(72) Inventors: Kyuhwan Chin, Gyeonggi-do (KR); Minkyoung Kim, Gyeongsangbuk-do (KR); Youngsup Oh, Gyeongsangbuk-do (KR); Chanik Park, Gyeongsangbuk-do (KR); Jaebok Shin, Gyeongsangbuk-do (KR)

(73) Assignees: Hyundai Motor Company, Seoul (KR); Kia Motors Corporation, Seoul (KR); Postech Academy-Industry Foundation, Pohang, Gyeongsangbuk-Do (KR)

( * ) Notice: Subject to any disclaimer, the term of this patent is extended or adjusted under 35 U.S.C. 154(b) by 222 days.

(21) Appl. No.: 15/836,727

(22) Filed: Dec. 8, 2017

(65) Prior Publication Data

US 2019/0028443 A1    Jan. 24, 2019

(30) Foreign Application Priority Data

Jul. 19, 2017    (KR) .................... 10-2017-0091246

(51) Int. Cl.
*H04L 29/06*    (2006.01)
*H04W 12/04*    (2009.01)
(Continued)

(52) U.S. Cl.
CPC .......... *H04L 63/0428* (2013.01); *B60R 25/24* (2013.01); *G07C 9/00309* (2013.01);
(Continued)

(58) Field of Classification Search
CPC ........ B60R 2325/101; B60R 2325/108; B60R 2325/205; H04W 12/06; H04W 12/02;
(Continued)

(56) References Cited

U.S. PATENT DOCUMENTS 9,356,918 B2    5/2016  Tsui et al.
9,747,740 B2 *  8/2017  Buttolo ................ G07C 9/0069
(Continued)

FOREIGN PATENT DOCUMENTS

JP    2004360222 A     12/2004
KR    10-2002-0081435     10/2002
(Continued)

OTHER PUBLICATIONS

Krawczyk, "SIGMA: The 'SIGn-and-MAc' Approach to Authenticated Diffie-Hellman and Its Use in the IKE Protocols," D. Boneh (Ed.): CRYPTO 2003, LNCS 2729, pp. 400-425, 2003.
(Continued)

*Primary Examiner* — Amir Mehrmanesh
(74) *Attorney, Agent, or Firm* — Mintz Levin Cohn Ferris Glovsky and Popeo, P.C.; Peter F. Corless

(57) ABSTRACT

A vehicle system is provided that performs authentication with a plurality of terminals. The system includes a server that generates a first token and transmits the first token to a first terminal. The first terminal stores the first token and a vehicle verifies the first token using a first encryption key and a first authentication key stored in advance for the first token. A second terminal receives the first token and a second token from the first terminal to be delegated with an authority. The second terminal stores the first token and the second token, and the vehicle verifies the first token stored in the second terminal using the first encryption key and the first authentication key, and verifies the second token stored in the second terminal using a second encryption key and a (Continued)

second authentication key stored in advance for the second token.

16 Claims, 11 Drawing Sheets

(51) Int. Cl.
| | |
|---|---|
| *G07C 9/00* | (2020.01) |
| *H04W 12/06* | (2009.01) |
| *H04W 12/02* | (2009.01) |
| *B60R 25/24* | (2013.01) |
| *B60R 25/01* | (2013.01) |

(52) U.S. Cl.
CPC ..... *G07C 9/00571* (2013.01); *G07C 9/00857* (2013.01); *H04L 63/061* (2013.01); *H04L 63/08* (2013.01); *H04W 12/02* (2013.01); *H04W 12/04* (2013.01); *H04W 12/06* (2013.01); *B60R 25/01* (2013.01); *B60R 2325/108* (2013.01); *G07C 2009/00412* (2013.01); *G07C 2009/00825* (2013.01); *G07C 2009/00865* (2013.01)

(58) Field of Classification Search
CPC .. H04W 12/04; H04L 63/0428; H04L 63/061; H04L 63/08; G07C 9/00309; G07C 9/00571; G07C 9/00857; G07C 2009/00825; G07C 2009/00865; G07C 2009/00412
See application file for complete search history.

(56) References Cited

U.S. PATENT DOCUMENTS

| | | | |
|---|---|---|---|
| 9,875,589 B1* | 1/2018 | Buttolo | ................. G08G 1/202 |
| 10,231,123 B2* | 3/2019 | Schussmann | ......... H04W 76/14 |
| 10,412,088 B2* | 9/2019 | Darnell | .................. H04L 63/10 |
| 2011/0264916 A1 | 10/2011 | Fischer et al. | |
| 2016/0203661 A1 | 7/2016 | Pudar et al. | |
| 2016/0217635 A1 | 7/2016 | Pudar et al. | |

FOREIGN PATENT DOCUMENTS

| | | |
|---|---|---|
| KR | 2006-0036981 A | 5/2006 |
| KR | 2012-0090148 A | 8/2012 |
| KR | 2012-0137729 A | 12/2012 |
| KR | 2015-0064910 A | 6/2015 |

OTHER PUBLICATIONS

Busold, et al, "Smart Keys for Cyber-Cars: Secure Smartphone-based NFC-enabled Car Immobilizer," CODASPY'13, Feb. 18-20, 2013 (10 pages).

\* cited by examiner

<REGISTRATION>

<AUTHENTICATION>

VEHICLE SYSTEM AND CONTROL METHOD THEREOF

CROSS-REFERENCE TO RELATED APPLICATION

This application claims the benefit of Korean Patent Application No. 10-2017-0091246, filed on Jul. 19, 2017 in the Korean Intellectual Property Office, the disclosure of which is incorporated herein by reference.

BACKGROUND

1. Field of the Disclosure

The present disclosure relates to a vehicle system of performing authentication with a plurality of terminals, and a method of controlling the vehicle system.

2. Description of the Related Art

A remote control system for vehicle enables a driver to open or close vehicle doors at a remote location or to start a vehicle at a remote location without any specific manipulation of inserting a key into a key box of the vehicle or for starting the vehicle. Representative examples of the remote control system for vehicle are a portable smart card and a FOB for wireless communications. Recently, a handheld-based mobile terminal has also been used to operate a vehicle remotely. However, since a manufacturer of such a mobile terminal is generally different from a manufacturer of the vehicle, the mobile terminal is required to be registered in the vehicle to function as a remote controller of the vehicle. Meanwhile, for a plurality of terminals to perform registration with a vehicle, each terminal should be assigned an authority from a server. However, when a substantial number of terminals access the server simultaneously, the server may enter a communication inability state, or personal information of the mobile terminals stored in the server may leak.

SUMMARY

Therefore, an aspect of the present disclosure provides a vehicle system of delegating an authority for controlling a vehicle to another mobile terminal through a registered mobile terminal instead of a server, and a method of controlling the vehicle system. Another aspect of the present disclosure provides a vehicle system of performing authentication with a plurality of registered mobile terminals, and a method of controlling the vehicle system. Additional aspects of the disclosure will be set forth in part in the description which follows and, in part, will be obvious from the description, or may be learned by practice of the disclosure.

In accordance with one aspect of the present disclosure, a vehicle system may include: a server configured to generate a first token, and to transmit the first token; a first terminal configured to receive the first token from the server, and to store the first token; a vehicle configured to verify the first token stored in the first terminal using a first encryption key and a first authentication key stored in advance for the first token; and a second terminal that is different from the first terminal. The first terminal may be configured to generate a second token and transmit the first token and the second token to the second terminal, to delegate an authority to the second terminal. The second terminal may be configured to store the first token and the second token. The vehicle may then verify the first token stored in the second terminal using the first encryption key and the first authentication key, and verify the second token stored in the second terminal using a second encryption key and a second authentication key stored in advance for the second token.

The server may be configured to generate the first encryption key and the first authentication key, and transmit the first encryption key and the first authentication key to the vehicle, and the vehicle may then verify the first token stored in the first terminal using the first encryption key and the first authentication key received from the server. The first terminal may be configured to generate the second encryption key and the second authentication key, and transmit the second encryption key and the second authentication key to the vehicle, and the vehicle may verify the first token stored in the second terminal using the first encryption key and the first authentication key received from the server, and verify the second token stored in the second terminal using the second encryption key and the second authentication key received from the first terminal.

Each of the server and the vehicle may be configured to generate the first encryption key and the first authentication key, and the vehicle may verify the first token stored in the first terminal using the first encryption key and the first authentication key. The server may be configured to generate a first security key based on a public key of the first terminal and a public key of the server, and transmit the first security key and the first token to the first terminal, the first terminal may then be configured to encrypt an identifier of the first terminal using the first security key, and store a first verification key generated as the result of the encryption. The vehicle may verify the first token stored in the first terminal, based on the first verification key stored in the first terminal, the first encryption key stored in advance in the vehicle, and the first authentication key stored in advance in the vehicle.

Further, the first terminal may be configured to generate a second security key based on the public key of the first terminal and a public key of the vehicle, and transmit the second security key, the first token, and the second token to the second terminal, the second security key is the second authentication key. The second terminal may be configured to encrypt an identifier of the second terminal using the second security key, and store a second verification key generated as the result of the encryption, and the vehicle may then decrypt the second token stored in the second terminal using the second encryption key stored in advance, and verify the second verification key using the second security key derived as the result of the decryption on the second token to thereby verify the second token. The vehicle may verify the first token stored in the second terminal using the first encryption key and the first authentication key stored in advance.

The server may be configured to encrypt the identifier of the first terminal, the first security key, and an authority value of the first terminal using the first authentication key, generate a first authentication code as the result of the encryption, encrypt the identifier of the first terminal, the first security key, the authority value of the first terminal, and the first authentication code using the first encryption key, and generate the first token as the result of the encryption. The first terminal may be configured to encrypt the identifier of the second terminal, the second security key, and the authority value of the second terminal using the first security key, generate the second authentication code as the result of the encryption, encrypt the identifier of the second terminal, the second security key, the authority value of the second terminal, and the second authentication code using the second encryption key, and generate the second token as the result of the encryption. The first terminal may be configured to transmit a delegation withdrawal request message to withdraw delegation to the second terminal to the vehicle, and when the vehicle receives the delegation withdrawal request message, the vehicle may delete information related to the second terminal.

In accordance with one aspect of the present disclosure, a method of controlling a vehicle system may include: at a server, generating a first token; at the server, transmitting the first token to a first terminal; at the first terminal, generating a second token to delegate an authority to a second terminal that is different from the first terminal; at the first terminal, transmitting the first token and the second token to the second terminal; at the second terminal, storing the first token and the second token; and at the vehicle, verifying the first token stored in the second terminal using a first encryption key and a first authentication key stored in advance, and verifying the second token stored in the second terminal using a second encryption key and a second authentication key stored in advance for the second token.

Before the server generates the first token, the method may further include: at the server, generating the first encryption key and the first authentication key; and at the server, transmitting the first encryption key and the first authentication key to the vehicle, wherein the verifying of the first token may include verifying the first token stored in the second terminal using the first encryption key and the first authentication key. Before the first terminal transmits the first token and the second token to the second terminal, the method may further include: at the first terminal, generating the second encryption key and the second authentication key; and at the first terminal, transmitting the second encryption key and the second authentication key to the vehicle, wherein the verifying of the second token may include verifying the second token stored in the second terminal using the second encryption key and the second authentication key received from the first terminal.

Additionally, before the server generates the first token, the method may further include: at each of the server and the vehicle, generating the first encryption key and the first authentication key, wherein the verifying of the first token may include verifying the first token stored in the second terminal using the first encryption key and the first authentication key. Before the server generates the first token, the method may further include, at the server, generating a first security key based on a public key of the first terminal and a public key of the server, wherein the transmitting of the first token to the first terminal in the server may include, at the server, transmitting the first security key and the first token to the first terminal, before the verifying of the first token and the second token, further comprising, at the first terminal, encrypting an identifier of the first terminal using the first security key, and storing a first verification key generated as the result of the encryption. The verifying of the first token and the second token may further include at the vehicle, verifying the first token stored in the first terminal based on the first verification key stored in the first terminal, the first encryption key stored in advance in the vehicle, and the first authentication key stored in advance in the vehicle.

The transmitting of the first token and the second token to the second terminal in the first terminal may include: generating a second security key based on the public key of the first terminal and a public key of the vehicle; and transmitting the second security key, the first token, and the second token to the second terminal, wherein the second security key is the second authentication key. The storing of the first token and the second token in the second terminal may include, at the second terminal, encrypting an identifier of the second terminal using the second security key, and storing a second verification key generated as the result of the encryption. The verifying of the first token and the second token may further include at the vehicle, decrypting the second token stored in the second terminal using the second encryption key stored in advance, and verifying the second verification key using the second security key derived as the result of the decryption on the second token to thereby verify the second token.

The verifying of the first token stored in the first terminal may include verifying the first token stored in the second terminal using the first encryption key and the first authentication key stored in advance. The generating of the first token in the server may include, at the server, encrypting the identifier of the first terminal, the first security key, and an authority value of the first terminal using the first authentication key, generating a first authentication code as the result of the encryption, encrypting the identifier of the first terminal, the first security key, the authority value of the first terminal, and the first authentication code using the first encryption key, and generating the first token as the result of the encryption.

The generating of the second security key may include: at the first terminal, encrypting the identifier of the second terminal, the second security key, and an authority value of the second terminal using the first security key, generating the second authentication key as the result of the encryption, encrypting the identifier of the second terminal, the second security key, the authority value of the second terminal, and the second authentication code using the second encryption key, and generating the second token as the result of the encryption.

The method of controlling a vehicle system may further include: at the first terminal, transmitting a delegation withdrawal request message for withdrawing delegation to the second terminal to the vehicle; and at the vehicle, receiving the delegation withdrawal request message, and deleting information related to the second terminal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
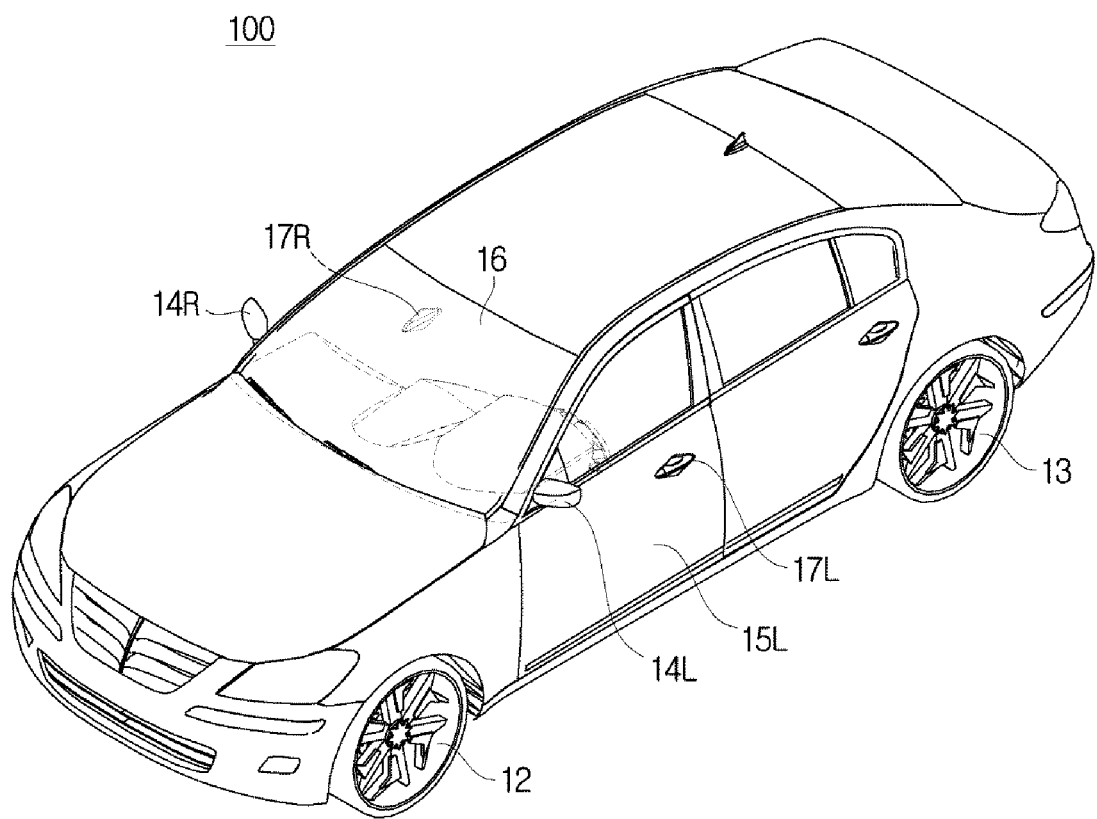
FIG. 1 shows an outer appearance of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Like reference numerals refer to like elements throughout this specification. This specification does not describe all components of exemplary embodiments, and general information in the technical field to which the present disclosure belongs or overlapping information between the embodiments will not be described. The terms "portion", "module", "member", and "block", as used herein, may be implemented as software or hardware, and according to embodiments, a plurality of "portions", "modules", "members", or "blocks" may be implemented as a single component, or a single "portion", "module", "member", or "block" may include a plurality of components.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

It will be understood that, although the terms first, second, etc. may be used herein to describe various components, these components should not be limited by these terms. These terms are only used to distinguish one component from another. Reference numerals used in operations are provided for convenience of description, without describing the order of the operations, and the operations can be executed in a different order from the stated order unless a specific order is definitely specified in the context.

Throughout this specification, a "public key" and a "private key" are a pair of unique keys that are symmetrical to each other and that are assigned to each apparatus, wherein the "public key" is used to encrypt data, and the "private key" is used to decrypt data. In other words, a file encrypted with a public key of a certain apparatus may be decrypted only with a private key of the apparatus, and may be unable to be decrypted with any private keys of other apparatuses.

Figure 2:
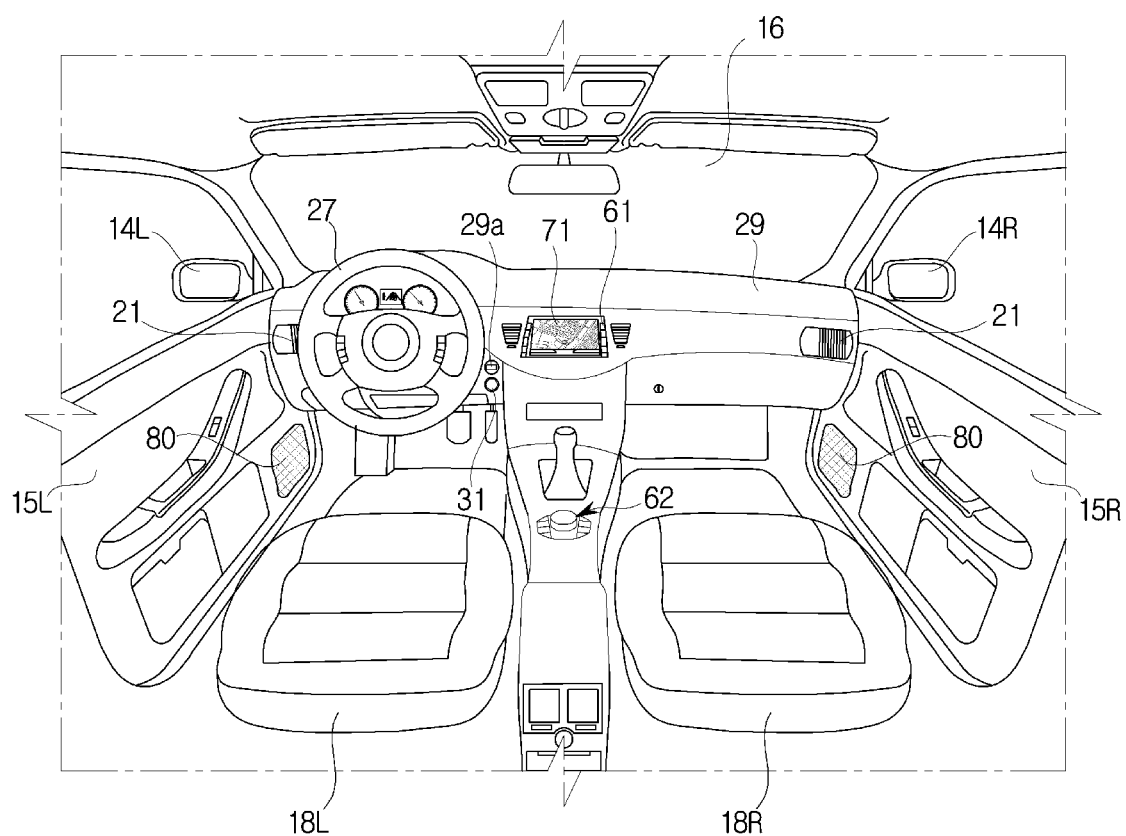
FIG. 2 shows an interior of a vehicle according to an exemplary embodiment of the present disclosure.

Hereinafter, an operation principle and exemplary embodiments of the present disclosure will be described with reference to the accompanying drawings. FIG. 1 shows an outer appearance of a vehicle according to an exemplary embodiment of the present disclosure, and FIG. 2 shows an interior of a vehicle according to an exemplary embodiment of the present disclosure.

Referring to FIG. 1, an outer appearance of a vehicle 100 according to an exemplary embodiment of the present disclosure may include a plurality of wheels 12 and 13 configured to move the vehicle 100, a plurality of doors 15L and 15R that shield the interior of the vehicle 100 from the outside, a front glass 16 that provides a driver within the vehicle 100 with a front view of the vehicle 100, and a plurality of side-view mirrors 14L and 14R that provide the driver with a rear view of the vehicle 100.

The wheels 12 and 13 may include front wheels 12 disposed in the front portion of the vehicle 100, and rear wheels 13 disposed in the rear portion of the vehicle 100. The vehicle 100 may include a driving apparatus (not shown) therein. The driving apparatus may provide rotatory power to the front wheels 12 or the rear wheels 13 to move the vehicle 100 forward or backward. The driving apparatus may be an engine to burn fossil fuel to produce rotatory power, or a motor to receive power from a condenser (not shown) to produce rotatory power. The doors 15L and 15R (see FIG. 2) may be rotatably disposed to the left and right of the vehicle 100 to allow the driver or a passenger to open one of the doors and enter the vehicle 100. Additionally, the doors 15L and 15R may shield the interior of the vehicle 100 from the outside when all of the doors are closed. In the outer appearance of the vehicle 100, handles 17L and 17R for enabling a user to open or close the doors 15L and 15R may be provided.

When a touch sensor of the doors 15L and 15R senses a touch input from the user carrying a mobile terminal 200 (see FIG. 3) registered in the vehicle 100, the vehicle 100 may be configured to perform authentication with the mobile terminal 200 via a wireless communication network. When the authentication is completed, a door lock of the vehicle 100 may be released to allow the user to pull one of the handles 17L and 17R to open the corresponding door 15L or 15R. Herein, the user includes a passenger as well as a driver. In other words, the user means a person who has the mobile terminal 200.

Further, the front glass 16 may be disposed in the upper front portion of the vehicle 100 to allow the driver within the vehicle 100 to acquire a front view of the vehicle 100. The front glass 16 may also be referred to as a windshield glass. The side-view mirrors 14L and 14R may include a left side-view mirror 14L disposed to the left of the vehicle 100 and a right side-view mirror 14R disposed to the right of the vehicle 100 to allow the driver within the vehicle 100 to acquire side and rear views of the vehicle 100. In addition, the vehicle 100 may include a proximity sensor configured to sense an obstacle or another vehicle present behind or beside the vehicle 10, a rain sensor configured to detect rain and sense an amount of rainfall, and an image sensor such as a camera.

Referring to FIG. 2, in the center portion of a dash board 29, an audio video navigation (AVN) display 71 and an AVN input unit 61 may be positioned. The AVN display 71 may be configured to display at least one of an audio screen, a video screen, and a navigation screen, selectively, and also display various control screens related to the control of the vehicle 100 or screens related to additional functions.

The AVN display 71 may be implemented with Liquid Crystal Display (LCD), Light Emitting Diode (LED), Plasma Display Panel (PDP), Organic Light Emitting Diode (OLED), or Cathode Ray Tube (CRT). The AVN input unit 61 may be disposed proximate to the AVN display 71, and implemented as a hard key type. When the AVN display 71 is implemented as a touch screen, the AVN input unit 61 may be provided in the form of a touch panel on the front surface of the AVN display 71. Additionally, a center input device 62 of a jog shuttle type may be disposed between a driver seat 18L and a passenger seat 18R. A user may turn or press the center input device 62 or push the center input device 62 in a up, down, left, or right direction to thus input a control command.

The vehicle 100 may include a sound output device 80 configured to output sound, and the sound output device 80 may be a speaker or other similar device. The sound output device 80 may be configured to output sound required for performing an audio function, a video function, a navigation function, and other additional functions. In the dashboard 29 in the vicinity of the driver seat 18L, a steering wheel 27 may be provided, and a key groove 29a into which a FOB (not shown) may be inserted may be formed at an area adjacent to the steering wheel 27. When the FOB is inserted into the key groove 29a, or when authentication between the FOB or the mobile terminal 200 and the vehicle 100 is completed via a wireless communication network, the FOB or the mobile terminal 200 may be connected to the vehicle 100.

In addition, a start button 31 for turning on/off the ignition of the vehicle 100 may be installed on the dashboard 29. When the FOB is inserted into the key groove 29a, or when a vehicle short-range communication module disposed around the start button 31 and a terminal short-range communication module of the mobile terminal 200 registered in the vehicle 100 receive and transmit authentication data to perform authentication, and the user presses the start button 31, the ignition of the vehicle 100 may be turned on. Meanwhile, the vehicle 100 may include an air conditioner configured to perform both heating and cooling to discharge heated or cooled air through air vents 21 to thus adjust internal temperature of the vehicle 100.

Figure 3:
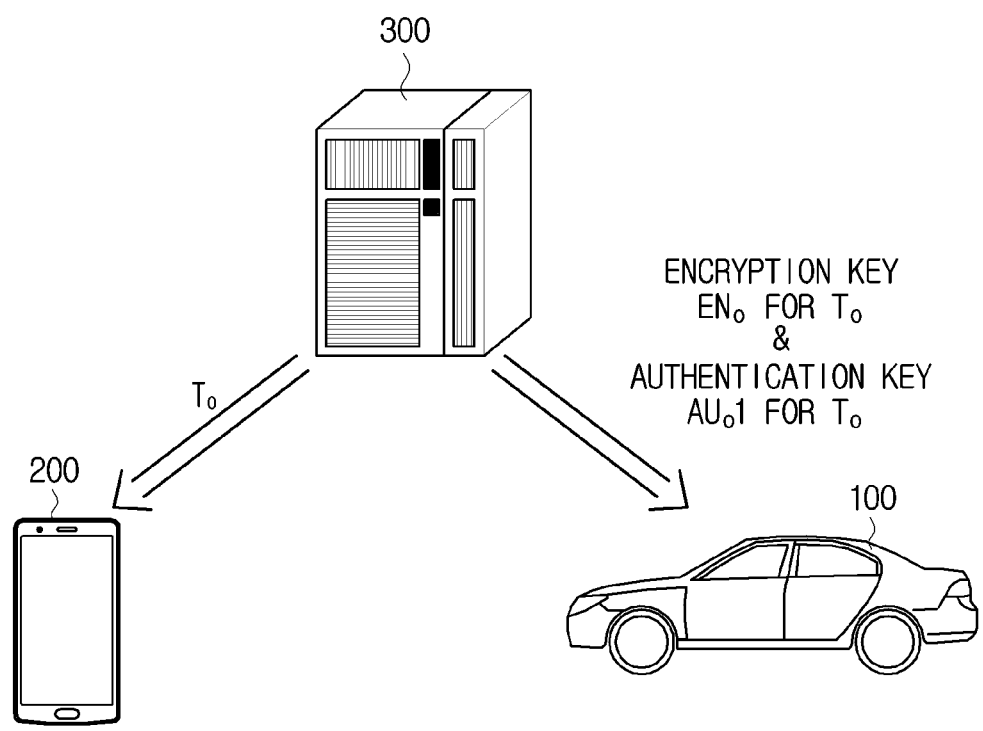
FIG. 3 illustrates a process of registering a mobile terminal in a vehicle in a vehicle system according to an exemplary embodiment of the present disclosure.
Figure 4:
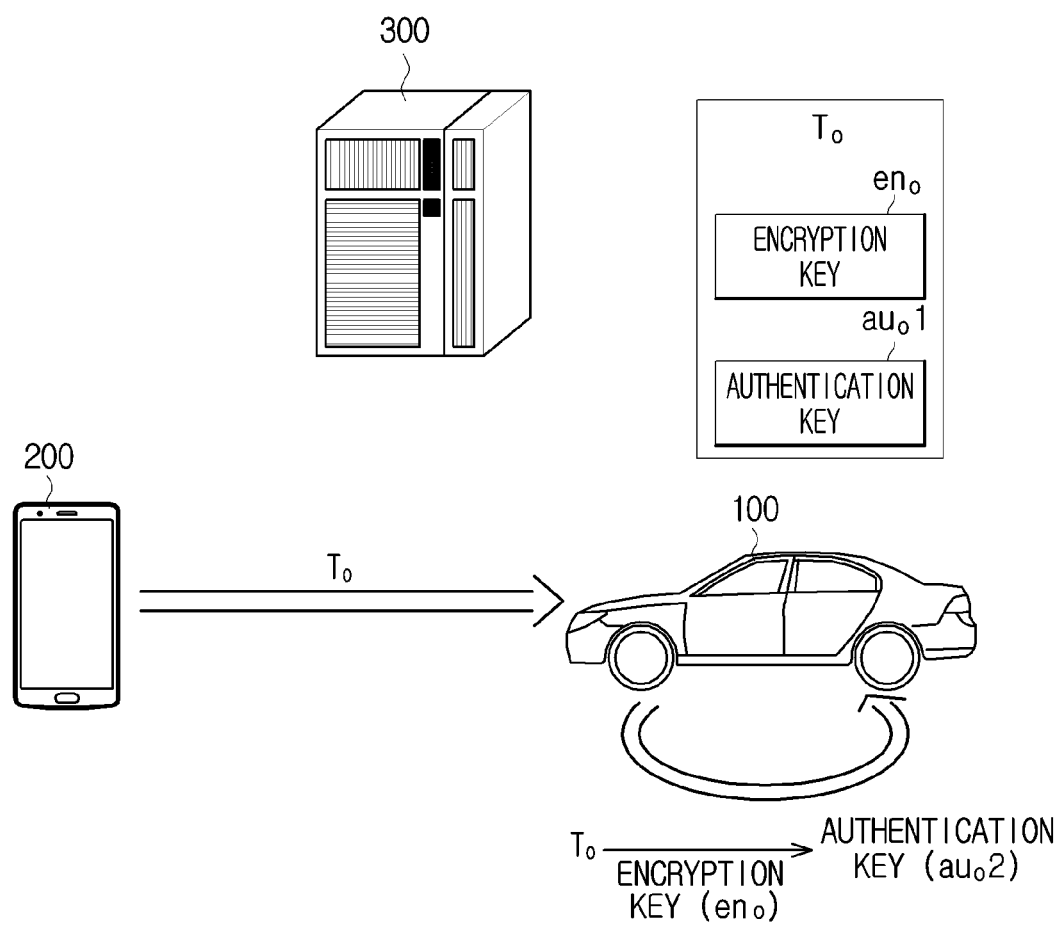
FIG. 4 illustrates an authentication process that is performed between a registered mobile terminal and a vehicle in a vehicle system according to an exemplary embodiment of the present disclosure.
Figure 5:
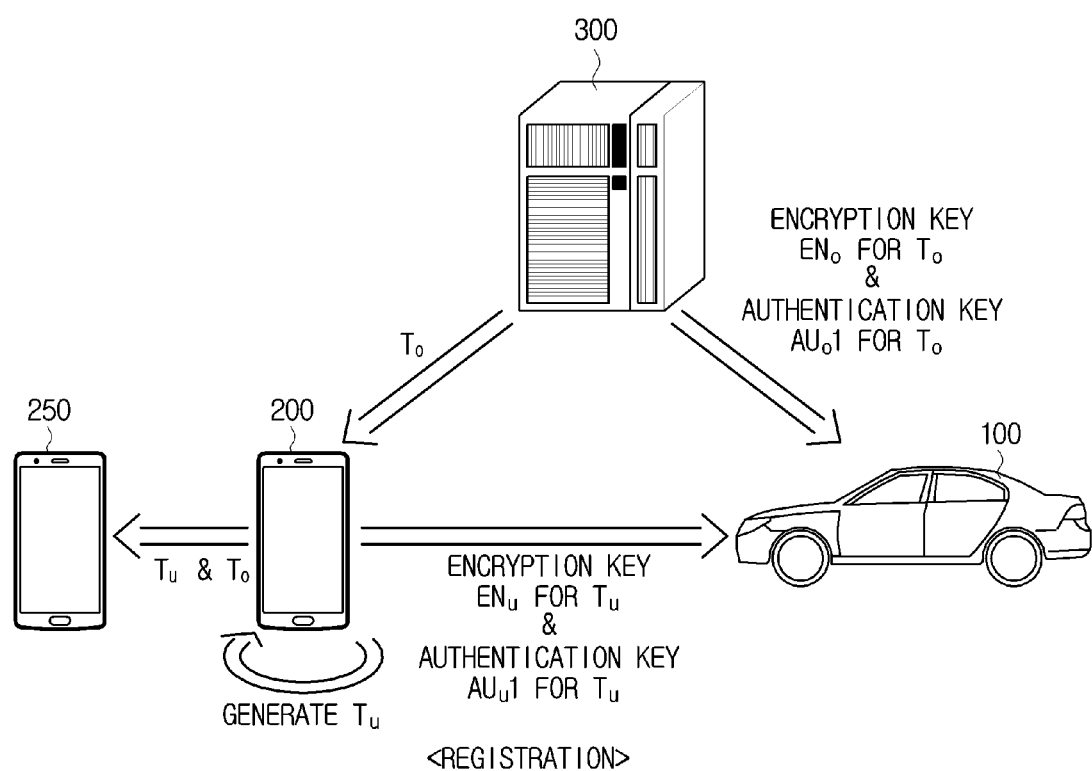
FIG. 5 illustrates a process of registering another mobile terminal in a vehicle so that the other mobile terminal is newly delegated with an authority in a vehicle system according to an exemplary embodiment of the present disclosure.
Figure 6:
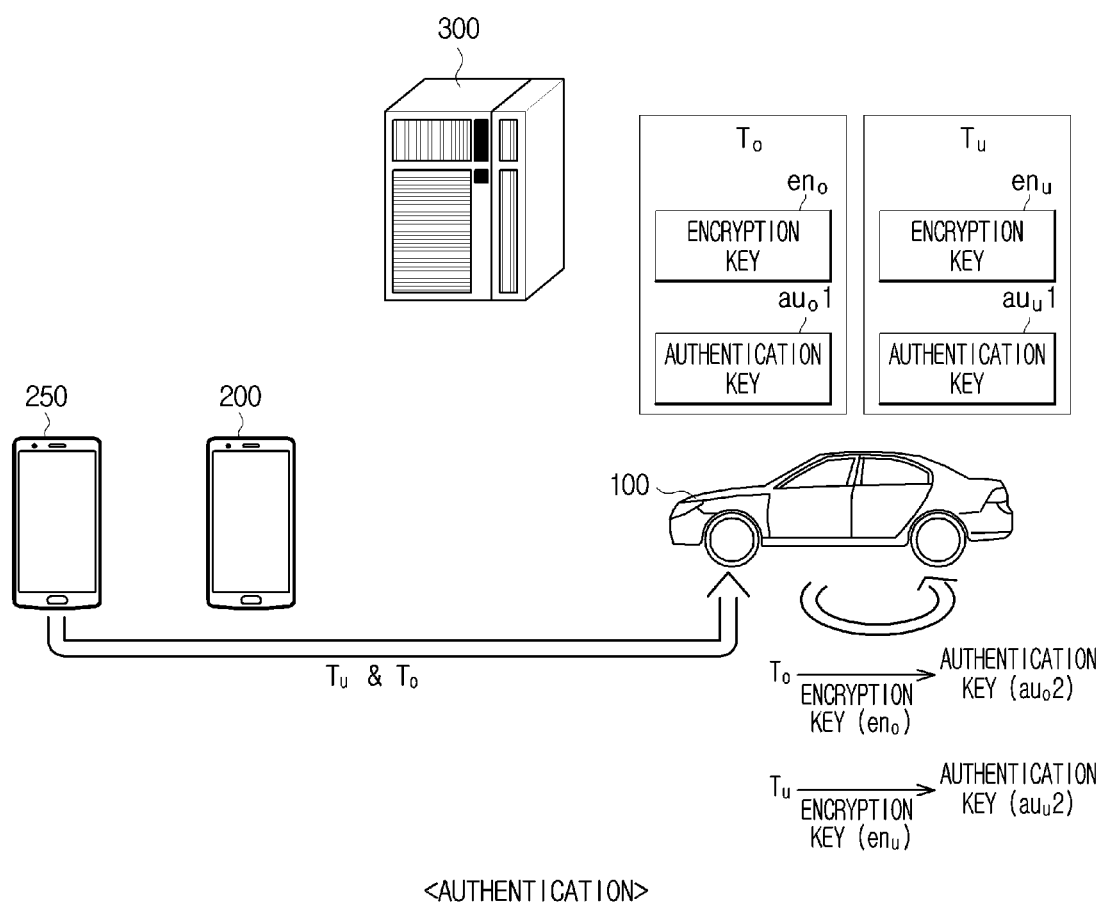
FIG. 6 illustrates an authentication process that is performed between another registered mobile terminal and a vehicle in a vehicle system according to an exemplary embodiment of the present disclosure.

FIGS. 3 to 6 illustrate various data that a vehicle system according to an exemplary embodiment of the present disclosure transmits and receives. FIG. 3 illustrates a process of registering a mobile terminal in a vehicle in a vehicle system according to an exemplary embodiment of the present disclosure, FIG. 4 illustrates an authentication process that is performed between a registered mobile terminal and a vehicle in a vehicle system according to an exemplary embodiment of the present disclosure, FIG. 5 illustrates a process of registering another mobile terminal in a vehicle so that the other mobile terminal is newly delegated with an authority in a vehicle system according to an exemplary embodiment of the present disclosure, and FIG. 6 illustrates an authentication process that is performed between another registered mobile terminal and a vehicle in a vehicle system according to an exemplary embodiment of the present disclosure.

The vehicle system may include the vehicle 100, the mobile terminal 200, and a server 300. Referring to FIG. 3, the vehicle 100 may be connected to the server 300 via a wireless communication network. The mobile terminal 200 may also be connected to the server 300 via the wireless communication network. Herein, the wireless communication network may include wireless communication networks that support various wireless communication methods, such as Global System for Mobile Communication (GSM), Code Division Multiple Access (CDMA), Wideband Code Division Multiple Access (WCDMA), Universal Mobile Telecommunications System (UMTS), Time Division Multiple Access (TDMA), Long Term Evolution (LTE), and the like, as well as Wireless-Fidelity (Wi-Fi) and Wireless Broadband.

In particular, to register the mobile terminal 200 within the vehicle 100 (e.g., for the mobile terminal 200 to be delegated an authority for operating components of the vehicle 100), the server 300 according to an exemplary embodiment of the present disclosure may be configured to generate a first token $T_o$ for the mobile terminal 200, and transmit the first token $T_o$ to the mobile terminal 200. Then, the server 300 may also be configured to generate an encryption key (hereinafter, referred to as a first encryption key $en_o$) for the first token $T_o$, and an authentication key (hereinafter, referred to as a first authentication key $au_o1$) for the first token $T_o$, and transmit the first encryption key $en_o$ and the first authentication key $au_o1$ to the vehicle 100.

The mobile terminal 200 may be configured to receive and store the first token $T_o$, and the vehicle 100 may be configured to receive and store the first encryption key $en_o$ and the first authentication key $au_o1$. The first encryption key $en_o$ may represent a key used to encrypt the first token $T_o$, and the first authentication key $au_o1$ may represent a key that is used to determine whether the mobile terminal 200 has been registered in the vehicle 100.

FIG. 3 shows an example that the vehicle 100 receives and stores the first encryption key $en_o$ and the first authentication key $au_o1$ generated by the server 300, however, the vehicle 100 may itself be configured to generate the first encryption key $en_o$ and the first authentication key $au_o1$ based on a public key shared with the server 300, which will be described later. When registration of the mobile terminal 200 is completed by the server 300, the mobile terminal 200 may be configured to perform authentication with the vehicle 100 to operate the components of the vehicle 100. Hereinafter, authentication of the mobile terminal 200 with respect to the vehicle 100 will be described.

Referring to FIG. 4, the vehicle 100 may be connected to the mobile terminal 200 via a short-range communication network. Herein, the short-range communication network may include a Wireless Local Access Network (WLAN), Wi-Fi, Bluetooth, Zigbee, Wi-Fi Direct (WFD), Ultra Wide-Band (UWB), Infrared Data Association (IrDA), Bluetooth Low Energy (BLE), Near Field Communication (NFC), Radio Frequency Identification (RFID), etc., although not limited to these.

When the mobile terminal 200 according to an exemplary embodiment of the present disclosure is connected to the vehicle 100 via a short-range communication network, the mobile terminal 200 may be configured to transmit the first token $T_o$ stored therein to the vehicle 100. The vehicle 100 may be configured to receive the first token $T_o$ from the mobile terminal 200 via the short-range communication network, and verify the first token $T_o$ using the first encryption key $en_o$ and the first authentication key $au_o1$ stored therein. More specifically, the vehicle 100 may be configured to decrypt the first token $T_o$ received from the mobile terminal 200 using the first encryption key $en_o$, and compare the result value $au_o2$ of the decryption to the first authentication key $au_o1$. When the vehicle 100 determines that the result value $au_o2$ of the decryption is identical to the first authentication key $au_o1$, the vehicle 100 may approve the control of the mobile terminal 200 on the vehicle 100.

Meanwhile, although not shown in the drawings, the vehicle 100 may include a communication device configured to receive the first token $T_o$ from the mobile terminal 200 or receive the first encryption key $en_o$ and the first authentication key $au_o1$ from the server 300, and a controller configured to verify the first token $T_o$ and to operate the components of the vehicle 100. The vehicle 100 may further include a storage device configured to store the first encryption key $en_o$ and the first authentication key $au_o1$ received from the server 300. The mobile terminal 200 may also include a communication device configured to receive the first token $T_o$ from the server 300 or to transmit the stored first token $T_o$ to the vehicle 100, and a controller (e.g., a mobile controller) configured to operate components of the mobile terminal 200. The mobile terminal 200 may further include a storage device configured to store the first token $T_o$ received from the server 300.

The server 300 may also include a communication device configured to transmit the first token $T_o$ to the mobile terminal 200 (e.g., a first mobile terminal 200) or to transmit the first encryption key $en_o$ and the second authentication key $au_o1$ to the vehicle 100, and a controller (e.g., a server controller) configured to operate components of the server 300. Each of the communication devices respectively included within the vehicle 100, the mobile terminal 200, and the server 300 may include a wireless communication interface having an antenna and a transceiver. In addition, the communication device may further include a signal conversion module configured to modulate a digital control signal to an analog wireless signal or to demodulate an analog wireless signal received via the wireless communication interface to a digital control signal.

Each of the controllers respectively included within the vehicle 100, the mobile terminal 200, and the server 300 may include a memory (not shown) configured to store algorithms for operating the components in the vehicle 100, the mobile terminal 200, and the server 300 or data of programs for executing the algorithms, and a processor (not shown) to perform the above-described operations using the data stored in the memory. The memory and the processor may be implemented as separate chips or a single chip.

Each of the storage devices respectively included within the vehicle 100 and the mobile terminal 200 may be implemented as at least one of a non-volatile memory device (e.g., a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or storage medium (for example, Hard Disk Drive (HDD) and Compact Disc Read Only Memory (CD-ROM)), although not limited to these. The storage device may be memory implemented as a separate chip from the processor described above in regard of the controller, or the storage device and the processor may be integrated into a single chip.

The mobile terminal 200 may be implemented as a computer or a mobile terminal connected to the server 300 via a wireless communication network. Herein, the computer may include, for example, a notebook computer with a WEB browser, a desktop computer, a laptop computer, a tablet PC, a slate PC, and the like, and the mobile terminal, which is, for example, a wireless communication apparatus ensuring portability and mobility, may include all types of handheld-based wireless communication apparatuses, such as Personal Communication System (PCS), Global System for Mobile communications (GSM), Personal Digital Cellular (PDC), Personal Handyphone System (PHS), Personal Digital Assistant (PDA), International Mobile Telecommunication (IMT)-2000, Code Division Multiple Access (CDMA)-2000, W-Code Division Multiple Access (W-CDMA), a Wireless Broadband Internet (Wibro) terminal, a smart phone, and the like, and a wearable apparatus, such as a watch, a ring, a bracelet, an ankle bracelet, a necklace, glasses, contact lenses, or a Head-Mounted Device (HMD). The mobile terminal 200 may further be configured to execute an application installed therein to perform the above-described registration or the above-described authentication.

Meanwhile, referring to FIG. 5, when another mobile terminal 250 (e.g., a second mobile terminal 250) is newly delegated with an authority and attempts to operate the components of the vehicle 100 after the mobile terminal 200 is registered in the vehicle 100, the other mobile terminal 250 may be delegated with the authority from the mobile terminal 200 registered in advance in the vehicle 100, not from the server 300. For convenience of description, the mobile terminal 200 registered in advance in the vehicle 100 will be referred to as a first terminal, and the other terminal 250 that is to be newly delegated an authority will be referred to as a second terminal.

The first terminal 200 may be connected to the second terminal 250 via a wired communication network, a wireless communication network, or a short-range communication network. The wired communication network may include various cable communication networks, such as a Universal Serial Bus (USB), a High Definition Multimedia Interface (HDMI), a Digital Visual Interface (DVI), Recommended Standard-232 (RS-232), power line communication, or Plain Old Telephone Service (POTS), as well as various kinds of wired communication networks, such as a Local Area Network (LAN), a Wide Area Network (WAN), or a Value Added Network (VAN).

The first terminal 200 according to an exemplary embodiment of the present disclosure may be configured to generate a second token $T_u$ for the second terminal 250, and transmit the second token $T_u$ and the first token $T_o$ stored therein to the second terminal 250. In addition, the first terminal 200 may be configured to generate a second encryption key $en_u$ and a second authentication key $au_u1$ for the second token $T_u$, and transmit the second encryption key $en_u$ and the second authentication key $au_u1$ to the vehicle 100. The second terminal 250 may be configured to receive the first token $T_o$ and the second token $T_u$ from the first terminal 200, and store the first token $T_o$ and the second token $T_u$ In addition, the vehicle 100 may be configured to receive the second encryption key $en_u$ and the second authentication key $au_u1$ from the first terminal 200, and store the second encryption key $en_u$ and the second authentication key $au_u1$. The second encryption key $en_u$ may represent a key used to encrypt the second token $T_u$, and the second authentication key $au_u1$ may represent a key that is used to determine whether the second terminal 250 has been registered in the vehicle 100.

FIG. 5 shows an example that the vehicle 100 receives and stores the second encryption key $en_u$ and the second authentication key $au_u1$ generated by the first terminal 200, however, the vehicle 100 may itself be configured to generate the second encryption key $en_u$ and the second authentication key $au_u1$ based on a public key shared with the first terminal 200, which will be described later. When registration of the second terminal 250 is completed by the first terminal 200, the second terminal 250 may be configured to operate the components of the vehicle 100 through authentication with the vehicle 100. Hereinafter, an authentication process of the second terminal 250 with respect to the vehicle 100 will be described.

Referring to FIG. 6, the second terminal 250 may be connected to the vehicle 100 via a short-range communication network. When the second terminal 250 according to an exemplary embodiment of the present disclosure is connected to the vehicle 100 via a short-range communication network, the second terminal 250 may be configured to transmit the first token $T_o$ and the second token $T_u$ stored therein to the vehicle 100.

The vehicle 100 may then be configured to receive the first token $T_o$ and the second token $T_u$ from the second terminal 250 via the short-range communication network, verify the first token $T_o$ using the first encryption key $en_o$ and the first authentication key $au_o1$ stored therein, and verify the second token $T_u$ using the second encryption key $en_u$ and the second authentication key $au_u1$ stored therein. More specifically, the vehicle 100 may be configured to decrypt the first token $T_o$ (e.g., previously encrypted) received from the second terminal 250 using the first encryption key $en_o$ stored therein, and compare the result value $au_o2$ of the decryption with the first authentication key $au_o1$ to determine whether the resultant value $au_o2$ of the decryption is identical to the first authentication key $au_o1$.

Additionally, the vehicle 100 may be configured to decrypt the second token $T_u$ (e.g., previously encrypted) received from the second terminal 250 using the second encryption key $en_u$ stored therein, and compare the result value $au_u2$ of the decryption to the second authentication key $au_u1$ to determine whether the result value $au_u2$ of the decryption is identical to the second authentication key $au_u1$. When the vehicle 100 determines that the result value $au_o2$ of the decryption on the first token $T_o$ is identical to the first authentication key $au_o1$, and that the result value $au_u2$ of the decryption on the second token $T_u$ is identical to the second authentication key $au_u1$, the vehicle 100 may be configured to approve the control of the second terminal 250 on the vehicle 100. In other words, the vehicle 100 may be configured to provide access to the second terminal 250.

Meanwhile, although not shown in the drawings, the second terminal 250 may also include a communication device configured to receive the first token $T_o$ and the second token $T_u$ from the first terminal 200, or to transmit the stored first token $T_o$ and the stored second token $T_u$ to the vehicle 100, and a controller configured to control components of the second terminal 250, and may further include a storage device configured to store the first token $T_o$ and the second token $T_u$ received from the first terminal 200.

The communication device of the second terminal 250 may include a port configured to communicate with the first terminal 200 via a wired communication network, and a wireless communication interface that has an antenna and a transceiver configured to communicate with the first terminal 200 via a wired communication network or a short-range communication network. In addition, the communication device may further include a signal conversion module to modulate a digital control signal to an analog wireless signal or to demodulate an analog wireless signal received via the wireless communication interface to a digital control signal.

The controller of the second terminal 250 may include a memory (not shown) configured to store algorithms for operating the components in the second terminal 250 or data of programs for executing the algorithms, and a processor (not shown) configured to perform the above-described operations using the data stored in the memory. The memory and the processor may be implemented as separate chips or a single chip. The storage device of the second terminal 250 may be implemented as at least one of a non-volatile memory device (for example, a cache, ROM, PROM, EPROM, EEPROM, and flash memory), a volatile memory device (for example, RAM), or storage medium (for example, HDD and CD-ROM)), although not limited to these. The storage device may be a memory implemented as a separate chip from the processor described above in regard of the controller, or the storage device and the processor may be integrated into a single chip.

Further, the second terminal 250 may be configured to execute an application installed therein to perform the above-described registration and the above-described authentication. The above-described exemplary embodiment relates to an example in which another mobile terminal 250 is newly delegated with an authority (e.g., newly provided with authority to operate the components). However, two or more mobile terminals may be delegated an authority. In particular, the mobile terminals may be newly delegated with an authority in the same method in which the second terminal 250 is delegated with an authority. Additionally, at least one component may be added or omitted to correspond to the performance of the components of the vehicle 100, the first terminal 200, the second terminal 250, and the server 300. It will be easily understood by those skilled in the art that the relative positions of the components may change in correspondence to the performance or structure of the system. Meanwhile, the components of the vehicle 100, the first terminal 200, the second terminal 250, and the server 300 may be software and/or hardware components such as a Field Programmable Gate Array (FPGA) or an Application Specific Integrated Circuit (ASIC).

Figure 7:
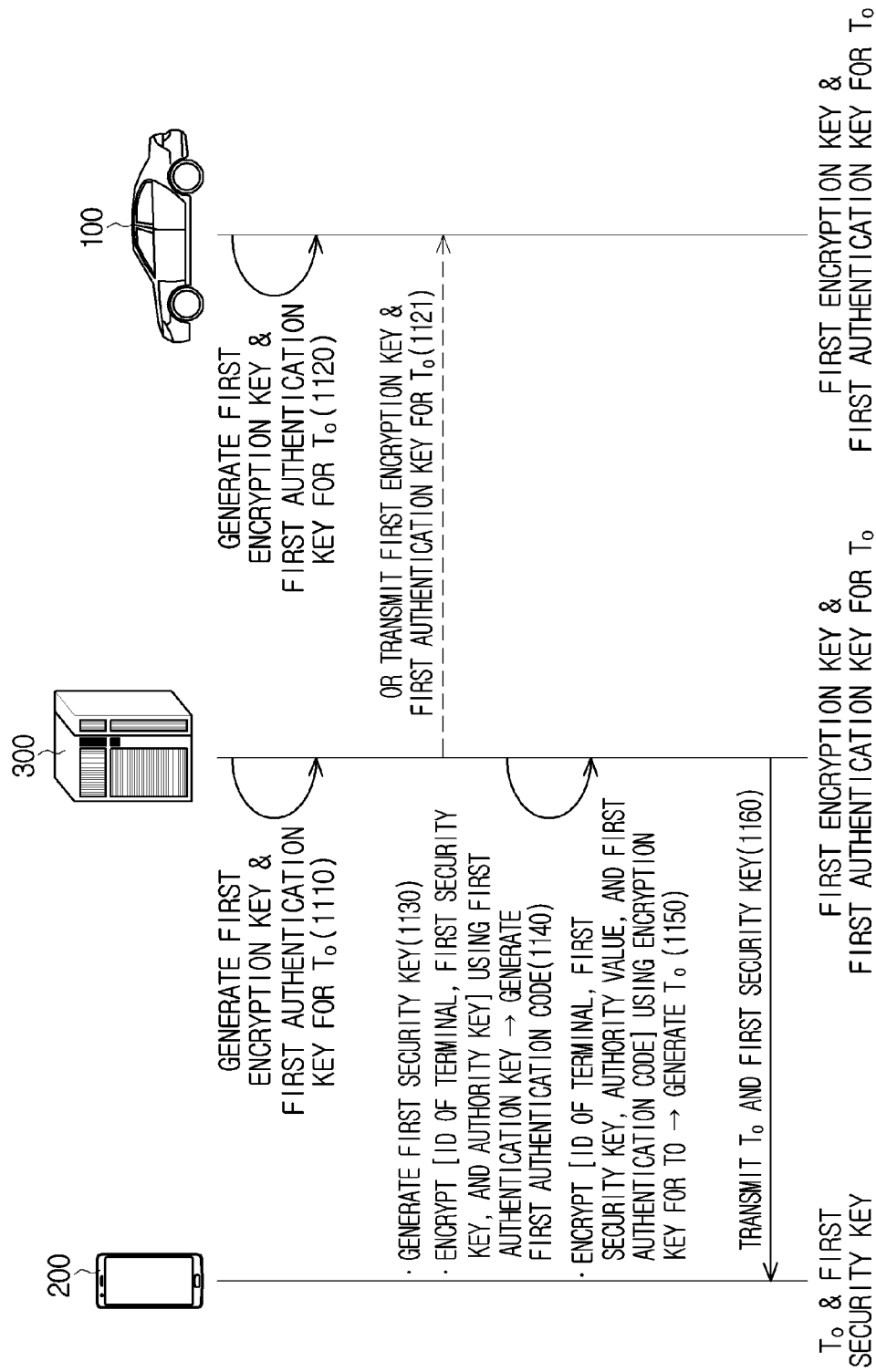
FIG. 7 is a flowchart illustrating a process of registering a first terminal in a vehicle, as described above with reference to FIG. 3, in a control method of a vehicle system according to an exemplary embodiment of the present disclosure.
Figure 8:
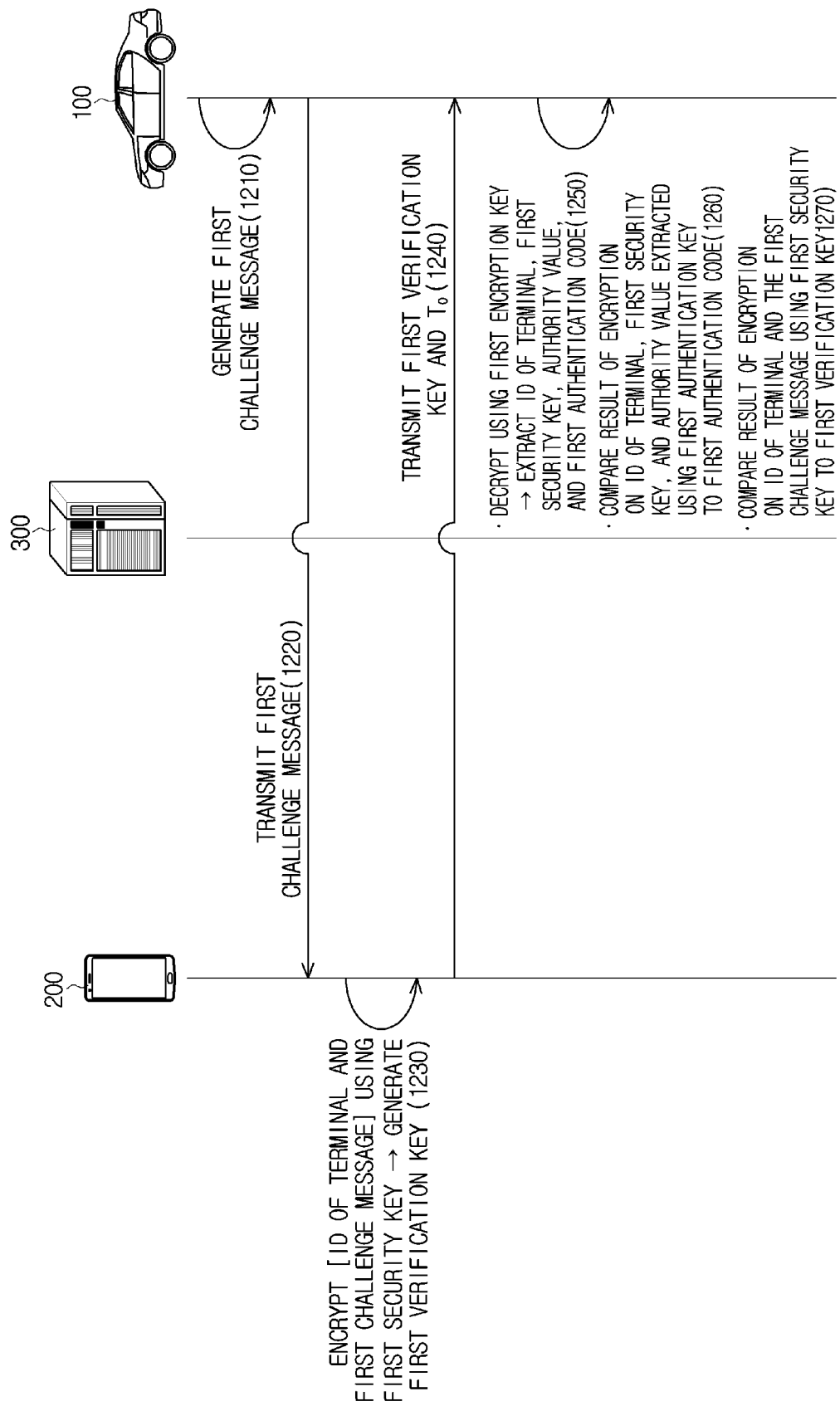
FIG. 8 is a flowchart illustrating an authentication process that is performed between a vehicle and a first terminal, as described above with reference to FIG. 4, in a control method of a vehicle system according to an exemplary embodiment of the present disclosure.
Figure 9:
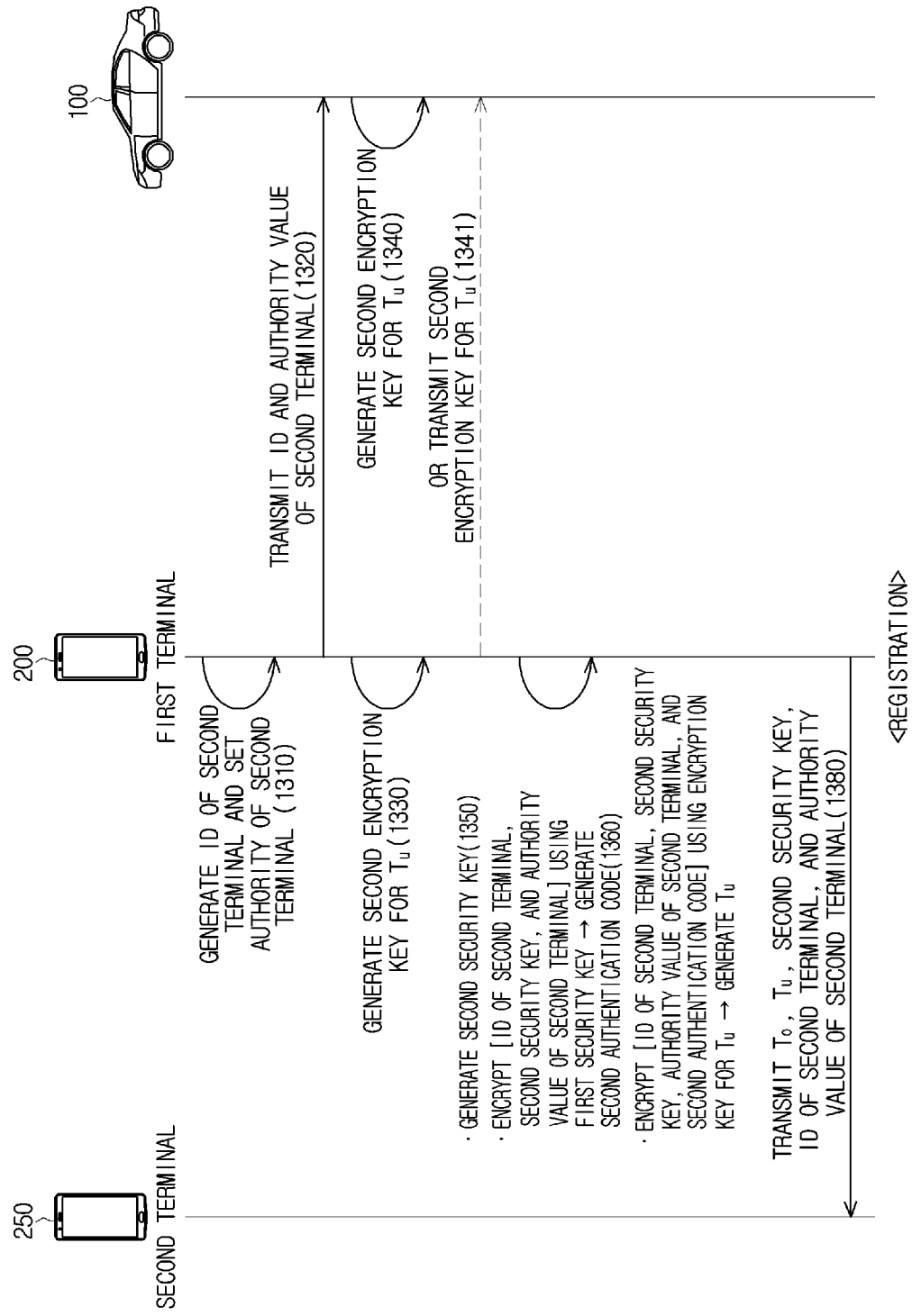
FIG. 9 is a flowchart illustrating a process of registering a second terminal in a vehicle, as described above with reference to FIG. 5, in a control method of a vehicle system according to an exemplary embodiment of the present disclosure.
Figure 10:
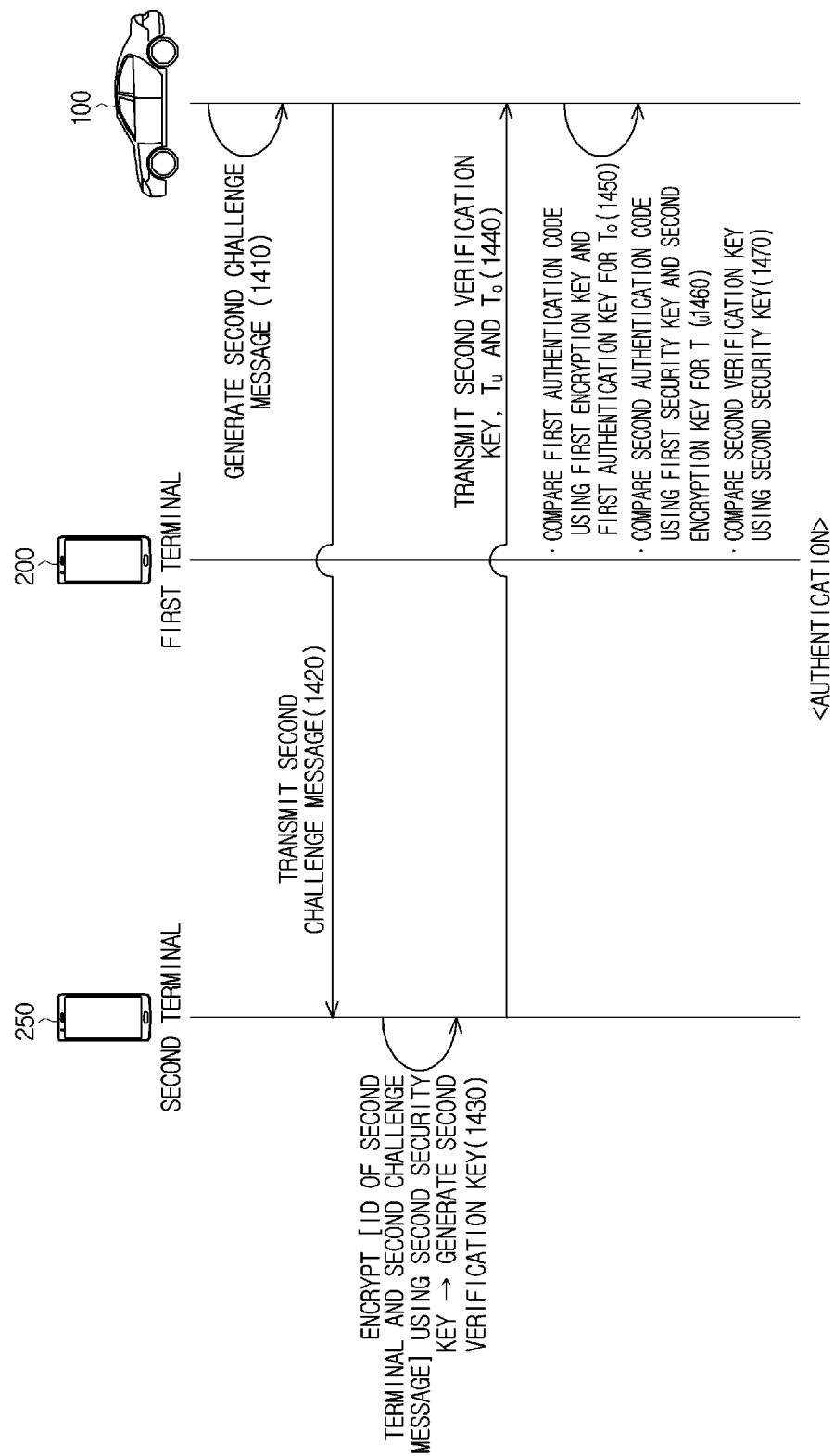
FIG. 10 is a flowchart illustrating an authentication process that is performed between a vehicle and a second terminal, as described above with reference to FIG. 6, in a control method of a vehicle system according to an exemplary embodiment of the present disclosure.

Hereinafter, processes in which the first terminal 200 and the second terminal 250 register and authenticate the vehicle 100 will be described in detail with reference to FIGS. 7 to 10. FIG. 7 is a flowchart illustrating a process of registering a first terminal in a vehicle, as described above with reference to FIG. 3, in a control method of a vehicle system according to an exemplary embodiment of the present disclosure, FIG. 8 is a flowchart illustrating an authentication process that is performed between a vehicle and a first terminal, as described above with reference to FIG. 4, in a control method of a vehicle system according to an exemplary embodiment of the present disclosure, FIG. 9 is a flowchart illustrating a process of registering a second terminal in a vehicle, as described above with reference to FIG. 5, in a control method of a vehicle system according to an exemplary embodiment of the present disclosure, and FIG. 10 is a flowchart illustrating an authentication process that is performed between a vehicle and a second terminal, as described above with reference to FIG. 6, in a control method of a vehicle system according to an exemplary embodiment of the present disclosure.

Referring to FIG. 7, the server 300 may be configured to generate a first encryption key $en_o$ and a first authentication key $au_o1$ for a first token $T_o$ to register the first terminal 200 in the vehicle 100, in operation 1110. The first encryption key $en_o$ and the first authentication key $au_o1$ may be generated using a pre-defined Key Derivation Function (KDF) (for example, SHA-256) which uses a pre-stored authority value of the first terminal 200, a pre-stored public key of the vehicle 100, and a pre-stored public key of the first terminal 200 as parameters.

FIG. 3 shows an example in which the server 300 transmits the first encryption key $en_o$ and the first authentication key $au_o1$ to the vehicle 100 (operation 1121) to allow the server 300 to share the first encryption key $en_o$ and the first authentication key $au_o1$ with the vehicle 100. However, the vehicle 100 may itself be configured to generate the first encryption key $en_o$ and the first authentication key $au_o1$ for the first token $T_o$ and store the first encryption key $en_o$ and the first authentication key $au_o1$ (operation 1120). In particular, the vehicle 100 may be configured to generate the first encryption key $en_o$ and the first authentication key $au_o1$ using a pre-defined Key Derivation Function (KDF) (for example, SHA-256) which uses a pre-stored authority value of the first terminal 200, a pre-stored public key of the vehicle 100, and a pre-stored public key of the first terminal 200 as parameters.

The server 300 may be configured to generate a first security key based on the authority value of the first terminal 200, the public key of the first terminal 200, and a public key of the server 300, in operation 1130. The first security key may be generated using the pre-defined KDF (e.g., SHA-256) which uses the authority value of the first terminal 200, the public key of the vehicle 100, and the public key of the first terminal 200 as parameters. The server 300 may be configured to encrypt an Identifier (ID) of the first terminal 200, the first security key, and the authority key of the first terminal 200 using the first authentication key $au_o1$, and generate a first authentication code as the result of the encryption, in operation 1140. The first authentication code may be generated using a pre-defined Hash-based Message Authentication Code (HMAC) which uses the first authentication key $au_o1$ as an encryption parameter.

Further, the server 300 may be configured to encrypt the ID of the first terminal 200, the first security key, the authority value of the first terminal 200, and the first authentication code using the first encryption key $en_o$, and generate a first token $T_o$ as the result of the encryption, in operation 1150. The first token $T_o$ may be decrypted using the first encryption key $en_o$. Then, the server 300 may be configured to transmit the first token $T_o$ and the first security key to the first terminal 200, in operation 1160.

The first terminal 200 may be configured to store the first token $T_o$ and the first security key, the server 300 may be configured to store the first encryption key $en_o$ and the first authentication key $au_o1$, and the vehicle 100 may be configured to store the first encryption key $en_o$ and the first authentication key $au_o1$, thereby completing operation of registering the first terminal 200. When operation of registering the first terminal 200 is completed, the first terminal 200 may be configured to operate the components of the vehicle 100 through authentication with the vehicle 100. Hereinafter, an authentication process of the first terminal 200 with respect to the vehicle 100 will be described in detail.

Referring to FIG. 8, when the first terminal 200 is connected to the vehicle 100 via a short-range communication network, the vehicle 100 may be configured to generate a first challenge message in operation 1210, and transmit the first challenge message to the first terminal 200, in operation 1220. The first challenge message may include an arbitrary random number and an ID of the vehicle 100.

The first terminal 200 may be configured to encrypt an ID of the first terminal 200 and the first challenge message using the first security key stored after the registration is completed, and generate a first verification key as the result of the encryption, in operation 1230. The first verification key may be generated using the pre-defined HMAC which uses the first security key as an encryption parameter. The first terminal 200 may then be configured to transmit the first verification key and the first token $T_o$ stored after the registration is completed to the vehicle 100, in operation 1240.

Further, in response to receiving the first verification key and the first token $T_o$, the vehicle 100 may be configured to decrypt the first token $T_o$ using the first encryption key $en_o$ stored after the registration is completed, in operation 1250. As a result of the decryption, the ID of the first terminal 200, the first security key, the authority value of the first terminal 200, and the first authentication code may be extracted. The vehicle 100 may then be configured to verify the ID of the first terminal 200, the first security key, and the authority value of the first terminal 200 using the first authentication key $au_o1$, in operation 1260. More specifically, the vehicle 100 may be configured to encrypt the ID of the first terminal 200, the first security key, and the authority value of the first terminal 200 using the pre-defined HMAC which uses the first authentication key $au_o1$ as an encryption parameter, and compare the result value of the encryption to the first authentication code extracted in advance.

When the vehicle 100 determines that the result value of the encryption on the ID of the first terminal 200, the first security key, and the authority value of the first terminal 200 is identical to the first authentication code, the vehicle 100 may be configured to verify the first verification key received from the first terminal 200 using the first security key, in operation 1270. In particular, the vehicle 100 may be configured to encrypt the ID of the first terminal 200 and the first challenge message generated by the vehicle 100 using the pre-defined HMAC which uses the extracted first security key as an encryption parameter, and compare the result value of the encryption on the ID of the first terminal 200 and the first challenge message generated by the vehicle 100 to the first verification value received from the first terminal 200. When the vehicle 100 determines that the result value of the encryption on the ID of the first terminal 200 and the first challenge message generated by the vehicle 100 is identical to the first verification value received from the first terminal 200, the vehicle 100 may be configured to approve the control of the first terminal 200 on the vehicle 100 in an authority range included in the authority value of the first terminal 200. The authority value may include information regarding components of the vehicle 100 that are to be operated, and information regarding an authority range for the corresponding components. For example, the authority value may include presence or absence of a door lock control authority, presence or absence of an ignition manipulation control authority, and presence or absence of a trunk opening/closing control authority.

Meanwhile, referring to FIG. 9, when the second terminal 250 not yet registered in the vehicle 100 attempts to be registered in the vehicle 100 after the first terminal 200 is registered in the vehicle 100, the first terminal 200 according to an exemplary embodiment of the present disclosure may be configured to generate an ID of the second terminal 250, and set an authority value of the second terminal 250, in operation 1310. The authority value may be set by an application stored in the first terminal 200.

The first terminal 200 may then be configured to transmit the ID and the authority value of the second terminal 250 to the vehicle 100, in operation 1320. Then, the first terminal 200 may be configured to generate a second encryption key $en_u$ for the second terminal 250, in operation 1330. The second encryption key $en_u$ may be generated using the pre-defined KDF (e.g., SHA-256) which uses the authority value of the second terminal 250, the public key of the vehicle 100 stored in advance, and the public key of the first terminal 200 as parameters.

FIG. 5 shows an example in which the first terminal 200 transmits the second encryption key $en_u$ to the vehicle 100 (operation 1341) to allow the first terminal 200 to share the second encryption key $en_u$ with the vehicle 100. However, the vehicle 100 may itself be configured to generate the second encryption key $en_u$ for the second token $T_u$ and store the second encryption key $en_u$ (operation 1340). In particular, the vehicle 100 may be configured to generate the second encryption key $en_u$ using the pre-defined KDF (for example, SHA-256) which uses the authority value of the second terminal 250 received from the first terminal 200, the public key of the vehicle 100, and the public key of the first terminal 200 as parameters.

Further, the first terminal 200 may be configured to generate a second security key based on the authority value of the second terminal 250, the public key of the first terminal 200, and the public key of the server 300, in operation 1350. The second security key may be generated using the pre-defined KDF (e.g., SHA-256) which uses the authority value of the second terminal 250, the public key of the vehicle 100, and the public key of the first terminal 200 as parameters. Then, the first terminal 200 may be configured to encrypt the ID of the second terminal 250, the second security key, and the authority value of the second terminal 250 using the first security key, and generate a second authentication code as the result of the encryption, in operation 1360. Herein, the first security key may function as the second authentication key $au_u1$ described above with reference to FIG. 5.

The second authentication code may be generated using the pre-defined HMAC which uses the first security key as a parameter. The first terminal 200 may be configured to encrypt the ID of the second terminal 250, the second security key, the authority value of the second terminal 250, and the second authentication code using the second encryption key $en_u$, and generate a second token $T_u$ as the result of the encryption, in operation 1370. The second token $T_u$ may be decrypted using the second encryption key $en_u$. Then, the first terminal 200 may be configured to transmit the first token $T_o$, the second token $T_u$, the second security key, the ID of the second terminal 250, and the authority value of the second terminal 250 to the second terminal 250, in operation 1380. The second terminal 250 which received the ID of the second terminal 250 and the authority value of the second terminal 250 may be configured to determine an ID assigned to itself and an authority range.

The second terminal 250 may be configured to store the first token $T_o$, the second token $T_u$, the second security key, the ID of the second terminal 250, and the authority value of the second terminal 250, the first terminal 200 may be configured to store the second encryption key $en_u$, the ID of the second terminal 250, and the authority value of the second terminal 250, and the vehicle 100 may be configured to store the second encryption key $en_u$, the ID of the second terminal 250, and the authority value of the second terminal 250, thereby completing operation of registering the second terminal 250. When operation of registering the second terminal 250 is completed, the second terminal 250 may be configured to operate the components of the vehicle 100 through authentication with the vehicle 100. Hereinafter, an authentication process of the second terminal 250 with respect to the vehicle 100 will be described in detail.

Referring to FIG. 10, when the second terminal 250 is connected to the vehicle 100 via a short-range communication, the vehicle 100 may be configured to generate a second challenge message, in operation 1410, and transmit the second challenge message to the second terminal 250, in operation 1420. The second challenge message may include an arbitrary random number and an ID of the vehicle 100.

The second terminal 250 may be configured to encrypt the ID of the second terminal 250 and the second challenge message using the second security key stored after the registration is completed, and generate a second verification key as the result of the encryption, in operation 1430. The second verification key may be generated using the pre-defined HMAC which uses the second security key as an encryption parameter. The second terminal 250 may then be configured to transmit the second verification key, and the first token $T_o$ and the second token $T_u$ stored after the registration is completed to the vehicle 100, in operation 1440.

The vehicle 100 which received the second verification key, the first token $T_o$, and the second token $T_u$ may be configured to decrypt the first token $T_o$ using the first encryption key $en_o$ stored after operation of registering the first terminal 200 is completed, in operation 1450. As a result of the decryption, the ID of the first terminal 200, the first security key, the authority value of the first terminal 200, and the first authentication code may be extracted. In addition, the vehicle 100 may be configured to verify the ID of the first terminal 200, the first security key, and the authority value of the first terminal 200 using the first authentication key $au_o1$, in operation 1450. Particularly, the vehicle 100 may be configured to encrypt the ID of the first terminal 200, the first security key, and the authority value of the first terminal 200 using the pre-defined HMAC which uses the first authentication key $au_o1$ as an encryption parameter, and compare the result of the encryption on the ID of the first terminal 200, the first security key, and the authority value of the first terminal 200 to the extracted first authentication code.

When the vehicle 100 determines that the result value of the encryption is identical to the first authentication code, the vehicle 100 may be configured to decrypt the second token $T_u$ using the second encryption key $en_u$ stored after operation of registering the second terminal 250 is completed, in operation 1460. As a result of the decryption, the ID of the second terminal 250, the second security key, the authority value of the second terminal 250, and the second authentication code may be extracted. The vehicle 100 may then be configured to verify the ID of the second terminal 250, the second security key, and the authority value of the second terminal 250 using the first security key, in operation 1460. In particular, the vehicle 100 may be configured to encrypt the ID of the second terminal 250, the second security key, and the authority value of the second terminal 250 using the pre-defined HMAC which uses the first security key as an encryption parameter, and compare the result value of the encryption to the extracted second authentication code. When the vehicle 100 determines that the result value of the encryption on the ID of the second terminal 250, the second security key, and the authority value of the second terminal 250 is identical to the second authentication code, the vehicle 100 may be configured to verify the second verification key received from the second terminal 250 using the second security key, in operation 1270.

In particular, the vehicle 100 may be configured to encrypt the ID of the second terminal 250 and the second challenge message generated by the vehicle 100 using the pre-defined HMAC which uses the extracted second security key as an encryption parameter, and compare the result value of the encryption on the ID of the second terminal 250 and the second challenge message generated by the vehicle 100 to the second verification key received from the second terminal 250. When the vehicle 100 determines that the result value of the encryption on the ID of the second terminal 250 and the second challenge message generated by the vehicle 100 is identical to the second verification key received from the second terminal 250, the vehicle 100 may be configured to approve the control of the second terminal 250 on the vehicle 100 in an authority range included in the authority value of the second terminal 250. In other words, the vehicle 100 may be configured to provide access for the second terminal 250 to operate the components within the vehicle 100).

Figure 11:
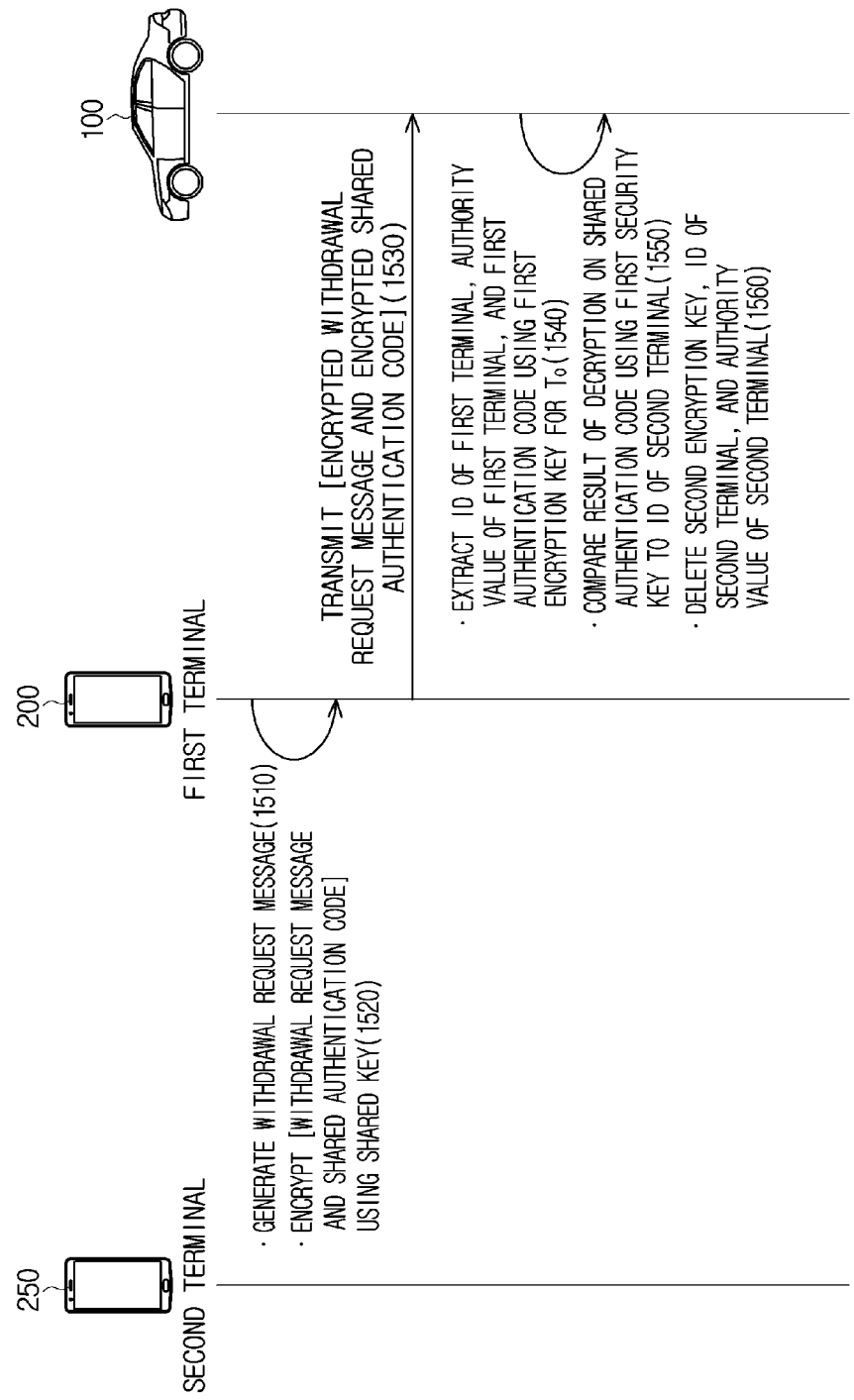
FIG. 11 is a flowchart illustrating a process of withdrawing registration of a second terminal, in a control method of a vehicle system according to an exemplary embodiment of the present disclosure.

Meanwhile, the first terminal 200 may be configured to withdraw registration of the second terminal 250 with respect to the vehicle 100. FIG. 11 is a flowchart illustrating a process of withdrawing registration of a second terminal, in a control method of a vehicle system according to an exemplary embodiment of the present disclosure. In particular, the first terminal 200 may be configured to generate a withdrawal request message for withdrawing registration of the second terminal 250, in operation 1510, and encrypt the withdrawal request message and an authentication code (hereinafter, referred to as a shared authentication code) for a public key using a pre-stored public key, in operation 1520.

The withdrawal request message may include the first token $T_o$, a withdrawal request value pre-defined with the vehicle 100, and a signature value. The signature value may include a withdrawal request value and the ID of the second terminal 250 encrypted with the first security key. More specifically, the shared authentication code may be generated by encrypting the withdrawal request message using the pre-defined HMAC which uses a public key shared with the vehicle 100 and the first terminal 200 as an encryption key.

The first terminal 200 may then be configured to transmit the shared authentication code and the withdrawal request message encrypted with the public key to the vehicle 100, in operation 1530. The vehicle 100 which received the encrypted withdrawal request message and the shared authentication code may decrypt the first token $T_o$ using the first encryption key $en_o$, and as the result values of the decryption on the first token $T_o$, the ID of the first terminal 200, the first security key, the authority value of the first terminal 200, and the first authentication code may be extracted, in operation 1540.

Additionally, the vehicle 100 may be configured to decrypt the signature value included in the withdrawal request message with the first security key. When the vehicle 100 determines that the ID of the second terminal 250 included in the signature value is identical to the ID of the second terminal 250 previously stored in the vehicle 100 (operation 1550), and that the withdrawal request value is included in the signature value, the vehicle 100 may be configured to delete or remove information related to the second terminal 250, in operation 1560. The information related to the second terminal 250 may include the second encryption key $en_u$, the ID of the second terminal 250, and the authority value of the second terminal 250.

According to the above-described exemplary embodiments, it may be possible to more easily register a new mobile terminal in a vehicle. Additionally, according to the above-described exemplary embodiments, since a mobile terminal may be delegated an authority not via a server, it may be possible to reduce damage due to the leakage of personal information stored in the server. Further, since a mobile terminal may be delegated an authority not via a server, it may also be possible to reduce dependence on the server upon authentication.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle system, comprising:
   a server configured to generate a first token;
   a first terminal configured to receive the first token from the server and store the first token;
   a vehicle controller configured to verify the first token stored in the first terminal using a first encryption key and a first authentication key stored in advance for the first token; and
   a second terminal that is different from the first terminal,
   wherein the first terminal is configured to generate a second token and transmit the first token and the second token to the second terminal, to delegate an authority to the second terminal,
   wherein the second terminal is configured to store the first token and the second token, and
   wherein the vehicle controller is configured to verify the first token stored in the second terminal using the first encryption key and the first authentication key and verify the second token stored in the second terminal using a second encryption key and a second authentication key stored in advance for the second token;

wherein the server is configured to generate a first security key based on a public key of the first terminal and a public key of the server, and transmit the first security key and the first token to the first terminal, the first terminal is configured to encrypt an identifier of the first terminal using the first security key, and store a first verification key generated as the result of the encryption, and the vehicle controller is configured to verify the first token stored in the first terminal, based on the first verification key stored in the first terminal, the first encryption key stored in advance in the vehicle, and the first authentication key stored in advance in the vehicle; and wherein the first terminal is configured to generate a second security key based on the public key of the first terminal and a public key of the vehicle, and transmit the second security key, the first token, and the second token to the second terminal, the second security key is the second authentication key, the second terminal is configured to encrypt an identifier of the second terminal using the second security key, and store a second verification key generated as the result of the encryption, and the vehicle controller is configured to decrypt the second token stored in the second terminal using the second encryption key stored in advance, and verify the second verification key using the second security key derived as the result of the decryption on the second token to verify the second token.

2. The vehicle system according to claim 1, wherein the server is configured to generate the first encryption key and the first authentication key and transmit the first encryption key and the first authentication key to the vehicle, and the vehicle controller is configured to verify the first token stored in the first terminal using the first encryption key and the first authentication key received from the server.

3. The vehicle system according to claim 2, wherein the first terminal is configured to generate the second encryption key and the second authentication key and transmit the second encryption key and the second authentication key to the vehicle, and the vehicle controller is configured to verify the first token stored in the second terminal using the first encryption key and the first authentication key received from the server, and verify the second token stored in the second terminal using the second encryption key and the second authentication key received from the first terminal.

4. The vehicle system according to claim 1, wherein each of the server and the vehicle controller is configured to generate the first encryption key and the first authentication key, and the vehicle controller is configured to verify the first token stored in the first terminal using the first encryption key and the first authentication key.

5. The vehicle system according to claim 1, wherein the vehicle controller is configured to verify the first token stored in the second terminal using the first encryption key and the first authentication key stored in advance.

6. The vehicle system according to claim 1, wherein the server is configured to encrypt the identifier of the first terminal, the first security key, and an authority value of the first terminal using the first authentication key, generate a first authentication code as the result of the encryption, encrypt the identifier of the first terminal, the first security key, the authority value of the first terminal, and the first authentication code using the first encryption key, and generate the first token as the result of the encryption.

7. The vehicle system according to claim 1, wherein the first terminal is configured to encrypt the identifier of the second terminal, the second security key, and the authority value of the second terminal using the first security key, generate the second authentication code as the result of the encryption, encrypt the identifier of the second terminal, the second security key, the authority value of the second terminal, and the second authentication code using the second encryption key, and generate the second token as the result of the encryption.

8. The vehicle system according to claim 1, wherein the first terminal is configured to transmit a delegation withdrawal request message for withdrawing delegation to the second terminal to the vehicle controller, and when the vehicle controller receives the delegation withdrawal request message, the vehicle controller is configured to delete information related to the second terminal.

9. A method of controlling a vehicle system, comprising:
receiving, by a first terminal, a first token generated by a server;
generating, by the first terminal, a second token to delegate an authority to a second terminal that is different from the first terminal; and
transmitting, by the first terminal, the first token and the second token to the second terminal;
wherein the first token and the second token are stored in the second terminal, and
wherein the first token stored in the second terminal is verified by a vehicle controller using a first encryption key and a first authentication key stored in advance and the second token stored in the second terminal is verified by a vehicle controller using a second encryption key and a second authentication key stored in advance for the second token;
receiving, by the first terminal, a first security key based on a public key of the first terminal and a public key of the server; and encrypting, by the first terminal, an identifier of the first terminal using the first security key, and storing a first verification key generated as the result of the encryption, wherein the first token stored in the first terminal is verified based on the first verification key stored in the first terminal, the first encryption key stored in advance in the vehicle, and the first authentication key stored in advance in the vehicle; and wherein the receiving of the first token and the second token to the second terminal in the first terminal comprises:
generating a second security key based on the public key of the first terminal and a public key of the vehicle; and transmitting the second security key, the first token, and the second token to the second terminal, wherein the second security key is the second authentication key, wherein an identifier of the second terminal is encrypted using the second security key, and wherein the second token stored in the second terminal is decrypted using the second encryption key stored in advance, and the second verification key is verified using the second security key derived as the result of the decryption on the second token to verify the second token.

10. The method according to claim 9, wherein:
the first encryption key and the first authentication key are generated at the server to transmit the first encryption key and the first authentication key to the vehicle controller, and
the first token stored in the second terminal is verified using the first encryption key and the first authentication key.

11. The method according to claim 10, further comprising:

generating, by the first terminal, the second encryption key and the second authentication key; and transmitting, by the first terminal, the second encryption key and the second authentication key to the vehicle controller, wherein the second token stored in the second terminal is verified using the second encryption key and the second authentication key.

12. The method according to claim 9, wherein the first token stored in the second terminal is verified using the first encryption key and the first authentication key.

13. The method according to claim 9, wherein the first token stored in the second terminal is verified using the first encryption key and the first authentication key stored in advance.

14. The method according to claim 9, wherein the identifier of the first terminal, the first security key, and an authority value of the first terminal are encrypted using the first authentication key, a first authentication code is generated as the result of the encryption, the identifier of the first terminal, the first security key, the authority value of the first terminal, and the first authentication code are encrypted using the first encryption key, and the first token is generated as the result of the encryption.

15. The method according to claim 9, wherein the generating of the second security key comprises:

encrypting, by the first terminal, the identifier of the second terminal, the second security key, and an authority value of the second terminal using the first security key, generating the second authentication key as the result of the encryption, encrypting the identifier of the second terminal, the second security key, the authority value of the second terminal, and the second authentication code using the second encryption key, and generating the second token as the result of the encryption.

16. The method according to claim 9, further comprising:

transmitting, by the first terminal, a delegation withdrawal request message for withdrawing delegation to the second terminal to the vehicle, wherein information related to the second terminal is deleted based on the delegation withdrawal request message.

* * * * *